(12) United States Patent
Allen et al.

(10) Patent No.: US 9,240,886 B1
(45) Date of Patent: Jan. 19, 2016

(54) AUTHENTICATION ADAPTATION

(75) Inventors: Nicholas Alexander Allen, Seattle, WA (US); Gregory B. Roth, Seattle, WA (US); David J. Whitney, Seattle, WA (US)

(73) Assignee: Amazon Technologies, Inc., Seattle, WA (US)

(*) Notice: Subject to any disclaimer, the term of this patent is extended or adjusted under 35 U.S.C. 154(b) by 397 days.

(21) Appl. No.: 13/590,038

(22) Filed: Aug. 20, 2012

(51) Int. Cl.
H04L 29/00 (2006.01)
H04L 9/32 (2006.01)

(52) U.S. Cl.
CPC .................................. *H04L 9/32* (2013.01)

(58) Field of Classification Search
CPC .................. G06F 7/04; H04L 20/96
USPC .......................................................... 726/6
See application file for complete search history.

(56) References Cited

U.S. PATENT DOCUMENTS 8,006,289 B2    8/2011  Hinton et al.
8,087,070 B2 *  12/2011 Koh et al. ................... 726/5

* cited by examiner

*Primary Examiner* — Jeffrey Pwu
*Assistant Examiner* — Michael D Anderson
(74) *Attorney, Agent, or Firm* — Davis Wright Tremaine LLP

(57) ABSTRACT

A system and method are provided to allow access to one or more computing resources using a single authentication scheme even though some of the computing resources may support different authentication schemes. In various embodiments, upon receiving a user request to access one or more computing resources, a first authentication credential according to a first authentication scheme is generated subsequent to successful authentication of the user. If processing of the request requires a second authentication credential according to a second authentication scheme, the second credential may be encapsulated in the first authentication credential and later extracted and combined with additional information, if necessary, for providing the requested access to the one or more computing resources.

24 Claims, 8 Drawing Sheets

AUTHENTICATION ADAPTATION

BACKGROUND

A computing environment may include multiple independent services providing access to a wide variety of computing resources. For example, a data storage service may allow users to store and manage data in backend data storage systems.

Each of these services may, for security purposes, require that users authenticate themselves to the service. Over time, the distributed computing environment may introduce new authentication schemes, for example, as new security technologies become available. However, converting all of the services to use a new authentication scheme simultaneously may be impractical or even impossible due to the design of the services and cost considerations.

BRIEF DESCRIPTION OF THE DRAWINGS

Various embodiments in accordance with the present disclosure will be described with reference to the drawings, in which.

DETAILED DESCRIPTION

Figure 1:
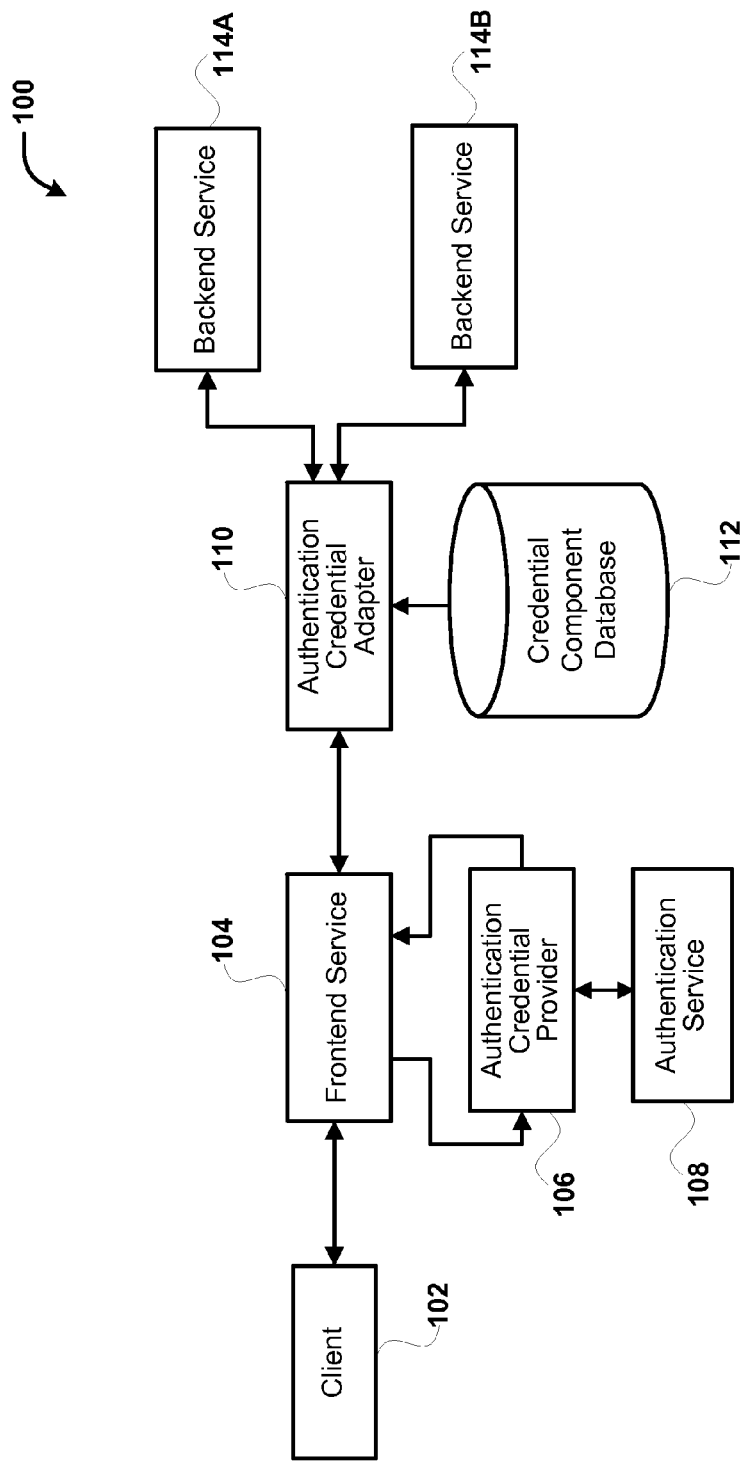
FIG. 1 illustrates an example environment for implementing aspects in accordance with various embodiments.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques, including systems and methods, described and suggested herein allow access to one or more computing resources using a single authentication scheme, when access to at least one of the computing resources is governed by another authentication scheme. For example, the systems and methods disclosed herein may allow a single session-based authentication scheme to be used for accessing multiple data storage servers, some of which may only support an impersonation-based authentication scheme.

In one embodiment, a user sends a request to a service provider requesting access to one or more computing resources. The service provider may comprise a frontend service and a plurality of backend services. The frontend service may direct a user's request to some of the backend services, which in turn fulfill the requested access to the one or more computing resources. In some embodiments, some of the backend services may use a first authentication scheme, whereas some other backend services may use a second authentication scheme. In some embodiments, the first and second authentication schemes may be incompatible schemes.

For example, under an impersonation-based authentication scheme, subsequent to verifying the identity of a user, a server may create an impersonation credential using its system account power that allows resources to be accessed as if the credential belonged to the user. In contrast, under a session-based authentication scheme, a server does not need to be provisioned with a system account power. Instead, as part of the user authenticating with the server the user may establish a session credential that acts as a set of temporary credentials, which allows requests made with the session credential to be verified as coming from the user. In various embodiments, different authentication schemes may require different authentication credentials. For example, an impersonation-based authentication scheme requires an impersonation credential while a session-based authentication scheme requires a session credential. In an embodiment, a session credential may be issued to and used by a particular user for a particular session. An impersonation credential, on the other hand, may be generated by a server to allow the server to access resources using a user's authorization context such as access rights, privileges and the like. Generally, an authentication credential refers to a collection of information that may be used for authenticating a user and/or gaining access to one or more computing resources. In an embodiment an authentication credential includes a token which encodes the collection of information.

In some cases, it may be desirable to have a frontend service to interact with a plurality of backend services on behalf of a user using a single authentication scheme, even though the backend services may implement or support different authentication schemes. Such an arrangement may, for example, allow the frontend service to take advantage of a newer and hence more secure authentication scheme, reduce the cost and complexity of the frontend service for handling different authentication schemes and the like.

In one embodiment, a front end service authenticates a user upon receiving a request to access one or more computing resources and obtains a first authentication credential (e.g., a session credential) conforming to a first authentication scheme. In some embodiments, it may be determined that at least some of the backend services used to fulfill the request uses a second authentication scheme that is different or otherwise incompatible from the first authentication scheme. Such determination may be based at least in part on the client request (such as request address, path, uniform resource identifier ("URI"), client's internet protocol ("IP") address, client identifier and the like), configurable information of the service provider and the like. In such cases, the first authentication credential may be constructed such that it encapsulates at least a second authentication credential (e.g., impersonation credential) that is required by the second authentication scheme. As used herein, the first authentication credential may be referred to as a "wrapper authentication credential" and the second authentication credential, a "wrapped authentication credential." In some embodiments, a wrapped credential is generated based at least in part on user identity information such as may be included in the client request, obtained during the authentication process or the like. In some embodiments, a wrapped authentication credential is at least in part inoperable for the intended use without additional information. For example, a wrapped authentication credential may include attributes whose values are required for authentication purposes but that are not populated or populated with invalid values. Examples of such values may include signing keys, cryptographic keys, timestamp, user authorization context information and the like. In some cases, values for such attributes may be obtained by querying an authorization database, for example, using user identity information.

After obtaining the first authentication credential, the frontend service may pass the first authentication credential through an authentication credential adapter before using it to call one or more backend services. As such, the frontend service may not need to communicate with additional authentication servers, for example, via a proxy server, therefore reducing the amount of overhead and delay. In some embodiments, the authentication credential adapter determines whether the first authentication credential (e.g., a session credential) requires adaptation by identifying one or more backend services to be used to fulfill the request and determining, based at least in part on the identified one or more backend services and whether an adapted credential (e.g., an impersonation credential) is needed to use the identified one or more backend services to fulfill the request. In some embodiments, the determination may be based at least in part on the request address, path, URI, client IP address, client identifier, configurable information obtainable from the service provider and the like. In other embodiments, the determination may be based on at least in part on indications encoded in the first authentication credential, such as sentinel values, credential origination assertions and the like.

In some embodiments, once it is determined that adaptation is needed, the authentication credential adapter generates the adapted second authentication credential based at least in part on the first authentication credential. In one embodiment, the wrapped second credential is extracted from the first wrapper authentication credential and combined, if necessary, with additional information to generate a fully operable authentication credential (e.g., an impersonation credential). In various embodiments, such additional information may include values contained in the wrapper credential, credential components selected from a credential component database, configuration files and the like. Examples of such additional information may include cryptographic keys, access rights and privilege information, timestamp and the like. In general, instructions on whether or how to generate the second authentication credential may be encoded or included in the wrapper authentication credential, wrapped authentication credential, the request to access computing resources and the like. Finally, authentication credentials, adapted if necessary, are used in connection with the intended backend services to enable the requested access to the computing resources.

Various approaches may be implemented in various environments for various applications. For example, FIG. 1 illustrates an example environment 100 for implementing aspects of the present disclosure in accordance with various embodiments. In the illustrative environment 100, a client 102 communicates with a frontend service 104 of a service provider, for example, via a network (not shown). In such embodiments, a service provider includes one or more frontend services 104 and a plurality of backend services 114A and 114B that fulfill client requests. Frontend service 104 may be implemented by a system that provides one or more access components to interface services provided by backend services with external entities, such as a user. For example, the frontend service may include a graphical user interface ("GUI"), Web-based interfaces, programmatic interfaces such as application programming interfaces ("APIs") and/or sets of remote procedure calls ("RPCs") corresponding to interface elements, messaging interfaces in which the interface elements correspond to messages of a communication protocol and/or suitable combinations thereof. The frontend service may also include customer authentication, authorization, usage metering and billing-related functions. In some embodiments, backend services 114A and 114B may be implemented by one or more replicated and/or distributed physical or logical computers or other devices that collectively provide access to computing resources, such as data storage services. In various embodiments, backend services may implement different authentication schemes. For example, backend service 114A and 11B may respectively support session-based and impersonation-based authentication schemes, discussed above. In various embodiments, client 102 refers to a computer application, such as a web browser, configured to issue requests on behalf of a user. In various embodiments, client 102 may run on devices such as personal computers, cell phones, smartphones, handheld messaging devices, laptop computers, tablet computers, set-top boxes, personal data assistants, electronic book readers and the like. In various embodiments, computing resources may include physical and/or virtual computing resources, such as computer systems, storage systems and/or other systems.

In an example embodiment, frontend service 104 is connected to an authentication credential provider (see FIG. 6, discussed below) that authenticates clients and issues authentication credentials according to a single authentication scheme. The authentication credential may use one or more authentication services 108 to perform authentication. In various embodiments, authentication service 108 may include an Active Directory, a certificate server, an identity provider and the like. In various embodiments, authentication credential provider 106, authentication service 108 and frontend service 104 may be operated by the same or different entities.

Various authentication methods may be used to authenticate a client. In some embodiments, authentication may be performed using user identity information included in the client request. For example, client 102 may make requests using Hypertext Transfer Protocol ("HTTP") and include user identity information in HTTP cookies that are sent along with the requests. In other embodiments, authentication may require client 102 to perform additional requests. For example, a challenge-response protocol (e.g., Kerberos) may be used wherein the service provider responds to an unauthenticated request with a challenge that client 102 must respond to with user identity information in a subsequent request to obtain authentication. As another example, as part of an authentication process, a user may be redirected to a web page at which user identity information may be entered. In various embodiments, client 102 may be provided with additional user identity information, such as HTTP cookies containing authentication data, that client 102 can subsequently use to avoid making additional requests.

As discussed above, in some embodiments, authentication credential provider 106 may issue authentication credentials according to a single authentication scheme (e.g., session-based authentication). In some instances, such authentication credentials may be used directly by frontend service 104 to access computing resources provided by backend services 114 when backend services 114 supports the single authentication scheme. Where a second authentication credential according to a different authentication scheme is required to fulfill the requested access, authentication credential provider 106 may provide a wrapper authentication credential that encapsulates, at least partially, the second authentication credential. In various embodiments, authentication credential provider 106 may also encode instructions on whether and/or how to generate the second authentication in the wrapper authentication credential, the wrapped authentication credential and the like. Such instructions may be used by an authentication credential adapter 110 to adapt wrapper authentication credentials.

In some embodiment, an authentication credential adapter 110 acts as an interface between frontend service 104 and backend services 114. Authentication credential adapter 110 typically extracts the wrapped authentication credential from a wrapper credential and combines it with additional information, if necessary, to construct a fully operable adapted authentication credential. In some embodiments, authentication credential adapter 110 communicates with a credential component database 112 to obtain the addition information. The adapted authentication credential may then be used with backend services to fulfill the requested access to computing resources.

In various embodiments, frontend service 104, authentication credential provider 106, authentication service 108, authentication credential adapter 110, credential component database 112 and backend services 114 may comprise one or more replicated and/or distributed physical or logical machines that collectively provide the functionalities described herein. In some embodiments, the above components of environment 100 may comprise one or more computing services provisioned from a cloud computing provider.

In various embodiments, the authentication service may include a federated identity service operated by the same or a different entity and may communicate with the rest of the system using any federation protocol, including without limitation Security Assertion Markup Language (SAML), OpenID and the like. Authenticated entities and credentials and services may correspond to identity stored locally at the service provider or at any external identity provider or service provider. Authentication may involve one or more factors and can take place over any communication channel using any communications device such as mobile devices, tablet, personal computers, touch tone telephone and the like.

Figure 2:
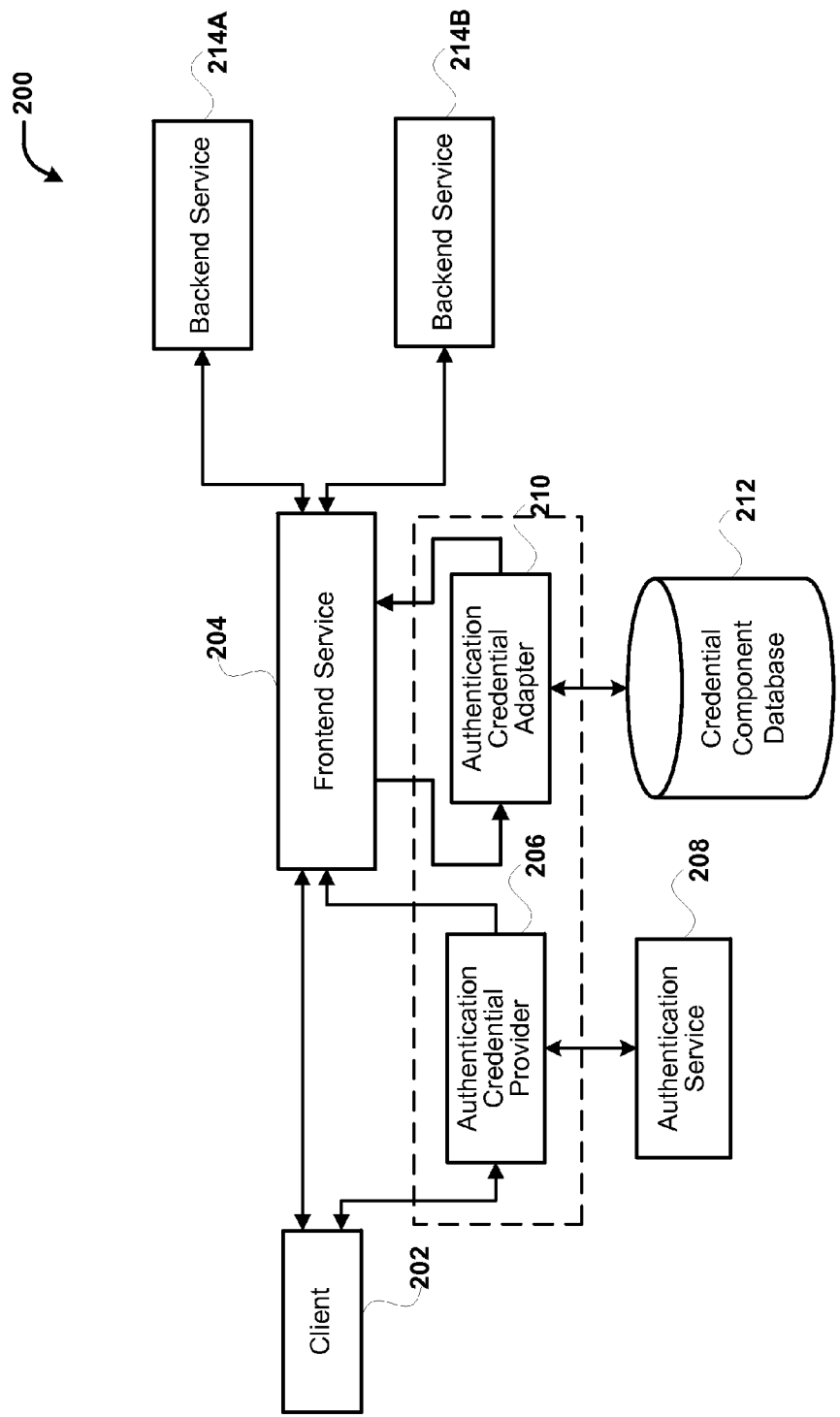
FIG. 2 illustrates an example environment for implementing aspects in accordance with various embodiments.
Figure 3:
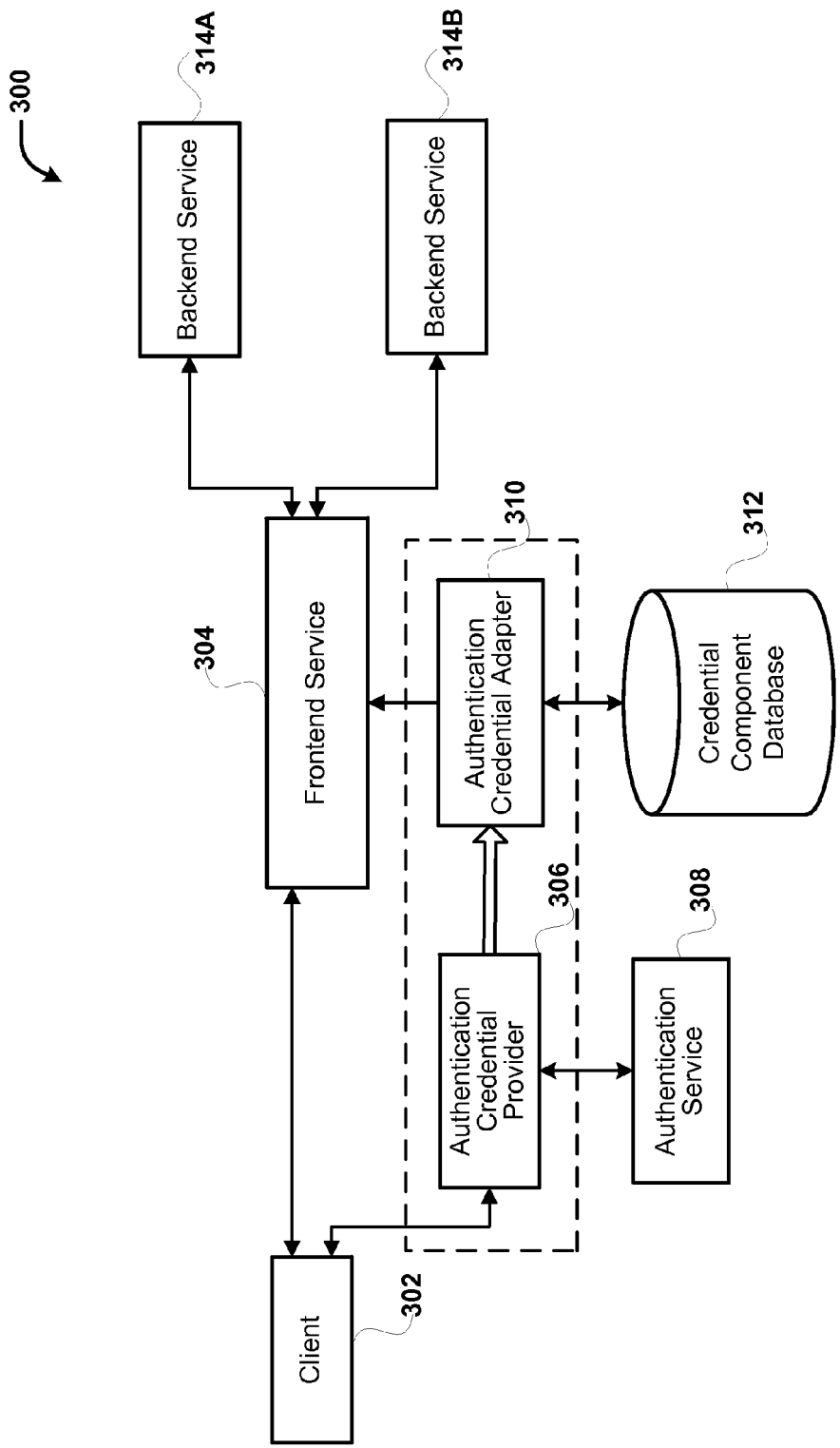
FIG. 3 illustrates an example environment for implementing aspects in accordance with various embodiments.

Components in environment 100 of FIG. 1 may be arranged in various configurations, as illustrated by FIGS. 2 and 3. For example, in environment 200 illustrated by FIG. 2, authentication credential provider 206 may act as interface between client 202 and frontend service 204 to authenticate users and to issue authentication credentials. Further, authentication credential adapter 210 returns credentials to frontend service 204 rather than forwarding the credentials to backend services 214, as illustrated in environment 100 in FIG. 1. As another example, in environment 300 illustrated by FIG. 3, authentication credential provider 306 passes information (e.g., authentication credentials and/or client requests) directly to authentication credential adapter 310 instead of through frontend service 304. As illustrated by the dashed box, in some embodiments, authentication credential provider and authentication credential adapter may be implemented by and/or co-located on the same system.

Figure 4:
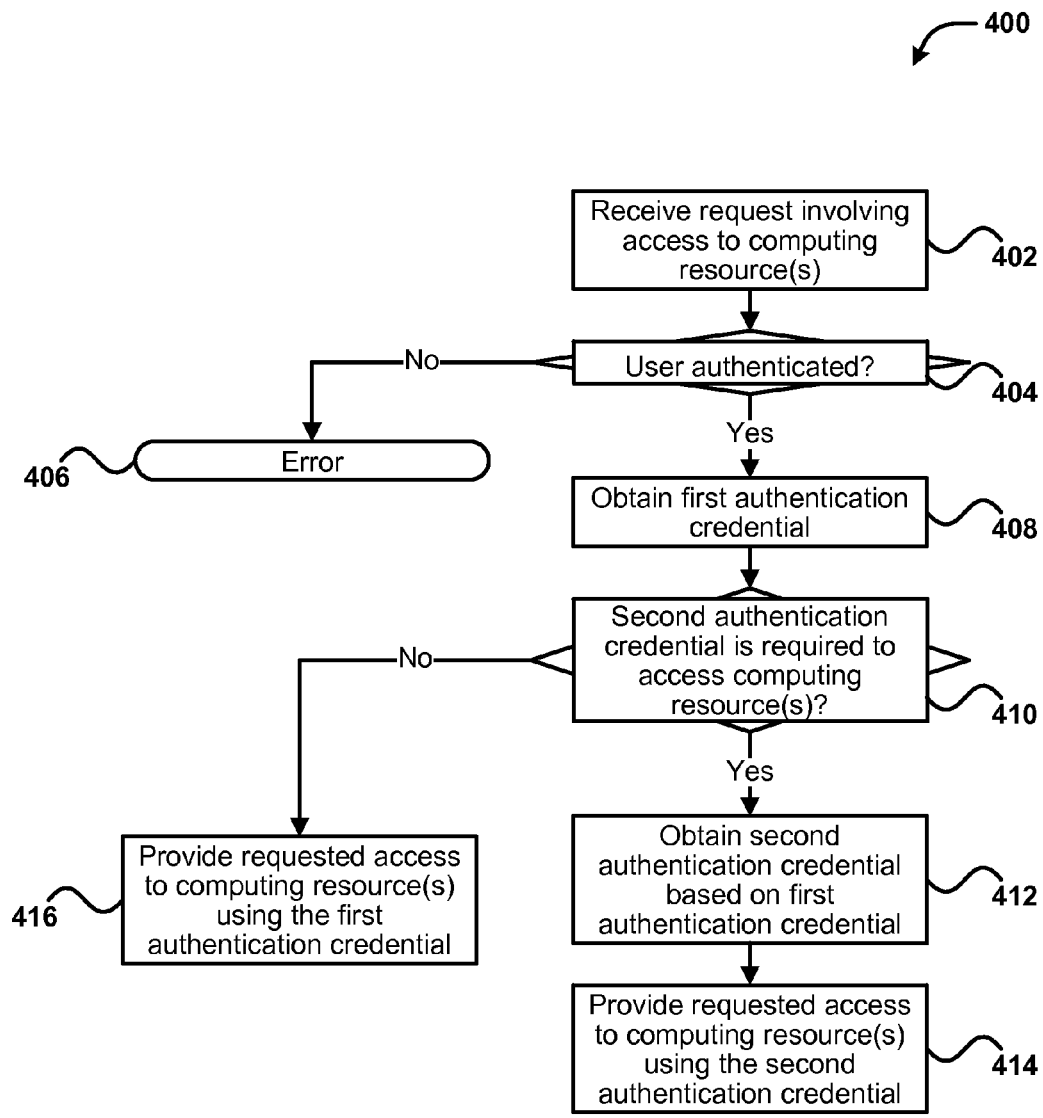
FIG. 4 illustrates an example process for providing access to computing resources, in accordance with one embodiment.

FIG. 4 illustrates an example process 400 for providing access to one or more computing resources, in accordance with one embodiment. Some or all of the process 400 (or any other processes described herein or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory. For example, in one embodiment, frontend service as discussed in connection with FIGS. 1, 2 and 3 performs process 400. In one embodiment, process 400 is performed to process an initial client request to access one or more computing resources.

In block 402, a system performing process 400 receives a request involving access to one or more computing resources from a client such as a web browser. In various embodiments, such requests may conform to protocols such as Representational State Transfer ("REST"), Simple Object Access Protocol ("SOAP"), XML-RPC, JSON-RPC and the like. In some embodiments, a request may include information such as an end point for accessing a specific service, an action to perform on an endpoint, parameters for a service and the like. A request may also include authentication data such as username and password, client IP address, digital certificate, digital signature generated using Hash-based Message Authentication Code ("HMAC"), public-key cryptography or the like, information of an identity provider and other any other information used to identify the client.

In decision block 404, a system performing process 400 determines whether a user for which the request is sent is authenticated. In some embodiments, the system determines whether a requesting client has been authenticated previously. In some embodiments, a client is authenticated if a session has been established for the client. A session may be a period of time for accessing one or more computing resources, which may be a definite or indefinite period of time that is limited by parameters of a session credential that has been generated for the session. In some embodiments, if a requesting client is determined to not have been authenticated previously, the system proceeds to authenticate the client. As discussed, the system may use any suitable authentication method(s) to authenticate the client. In one embodiment, the system may provide a login page prompting a user to enter a username and a password. In another embodiment, the system may require a user to provide multifactor authentication information using, for instance, one-time password (OTP), a smartcard, biometric techniques (such as techniques involving fingerprints, retinas, palms and/or voice) and the like. In another embodiment, the system may verify client identity information such as username and password, client IP address, digital certificate, digital signature and the like. In some embodiments, the system may require the client to perform additional requests, for example, using a challenge-response protocol such as Kerberos. In various embodiments, the authentication process may involve one or more authentication services such as described in connection with FIG. 1.

If the client is not authenticated, in some embodiments, the system performing process 400 causes an error message to be sent to the client in block 406. In some embodiments, the system may allow a user to re-authenticate with the system using the same or a different authentication method. In other embodiments, the system may allow a user to retrieve authentication data such as passwords subject to some verification.

Otherwise, if the client is authenticated, then in block 408, the system performing process 400 obtains a first authentication credential according to a first authentication scheme. In some embodiments, the first authentication scheme is a session-based authentication scheme. As discussed, an authentication credential refers to a collection of information that may be used for authenticating a user and/or gaining access to one or more computing resources. For example, the first authentication credential may be a session credential as described above. In some embodiments, the system performing process 400 obtains the first authentication credential that has been previously generated for the particular client (e.g., from a cache). In other embodiments, the system generates the first credential from scratch based, for example, on the client identity, the request and other information. In some embodiments, the system performing process 400 caches authentication credentials associated with each client.

In some instances, the obtained authentication credential may be used directly with a backend service. Such may be the case, for example, when the obtained authentication credential is a session credential and the backend service supports session-based authentication. In other instances, the obtained authentication credential must be adapted to be used with a backend service. For example, when a session credential is obtained but the backend service supports only impersonation-based authentication, the session credential must be adapted to become an impersonation credential to be used with the backend service. In various embodiments, determination of whether adaptation is needed includes identifying one or more backend services used to fulfill the request based on the client request (such as request address, path, URI, client IP address, client identifier and the like), configurable information of the service provider and the like. To enable adaptation, in some embodiments, the system performing process 400 may encapsulate at least a part of a second authentication credential in the first authentication credential, where the second authentication credential is determined to be required to process the client request. For example, the first credential may be a session credential that encapsulates a partially inoperable impersonation credential. In some embodiments, authentication credentials may be provided by an authentication credential provider as described in connection with FIG. 1 (see also FIG. 6, discussed below).

In decision block 410, the system performing process 400 determines whether a second authentication credential is required to access the requested access to computing resources. In some embodiments, the determination may be based at least in part on identifying indications encoded by the first authentication credential obtained. In other embodiments, the determination may be based at least in part on identification of backend services required to process the client request. For example, such identification may be based at least in part on request address, path, URI, client IP address, client identifier, configurable information obtainable from the service provider and the like.

If a second authentication credential is determined not to be required, then in block 416, the system performing process 400 provides the requested access to computing resources using the first authentication credential. In some embodiments, the system forwards the request with the first authentication credential to one or more backend services. In some other embodiments, the system returns the first authentication credential to the client, which then uses the credential to access backend services. In yet some other embodiments, the system may return the first authentication credential to a third party that may be authorized to act on the client's behalf to access the computing resources.

Otherwise, if a second authentication credential is determined be required, then in block 412, the system performing process 400 obtains the second authentication credential. In some embodiments, the system performing process 400 obtains the second authentication credential that has been previously generated for the particular client (e.g., from a cache). In other embodiments, the system generates the second authentication credential based at least in part on the first authentication credential. In one embodiment, the system recognizes that the first authentication credential as a wrapper credential based on some indication (e.g., a sentinel value) included in the first authentication credential, extracts the wrapped credential and constructs a fully operable second credential based at least in part on the extracted credential, if necessary. In some embodiments, the system performing process 400 caches authentication credentials obtained in block 412 for the corresponding client and/or backend service. In some embodiments, blocks 410 and 412 may be performed by an authentication credential adapter as described in connection with FIG. 1 (see also FIG. 7, discussed below). In block 414, the system performing process 400 provides the requested access to computing resources using the second authentication credential in a similar manner as described in connection with block 416 of FIG. 4.

Figure 5:
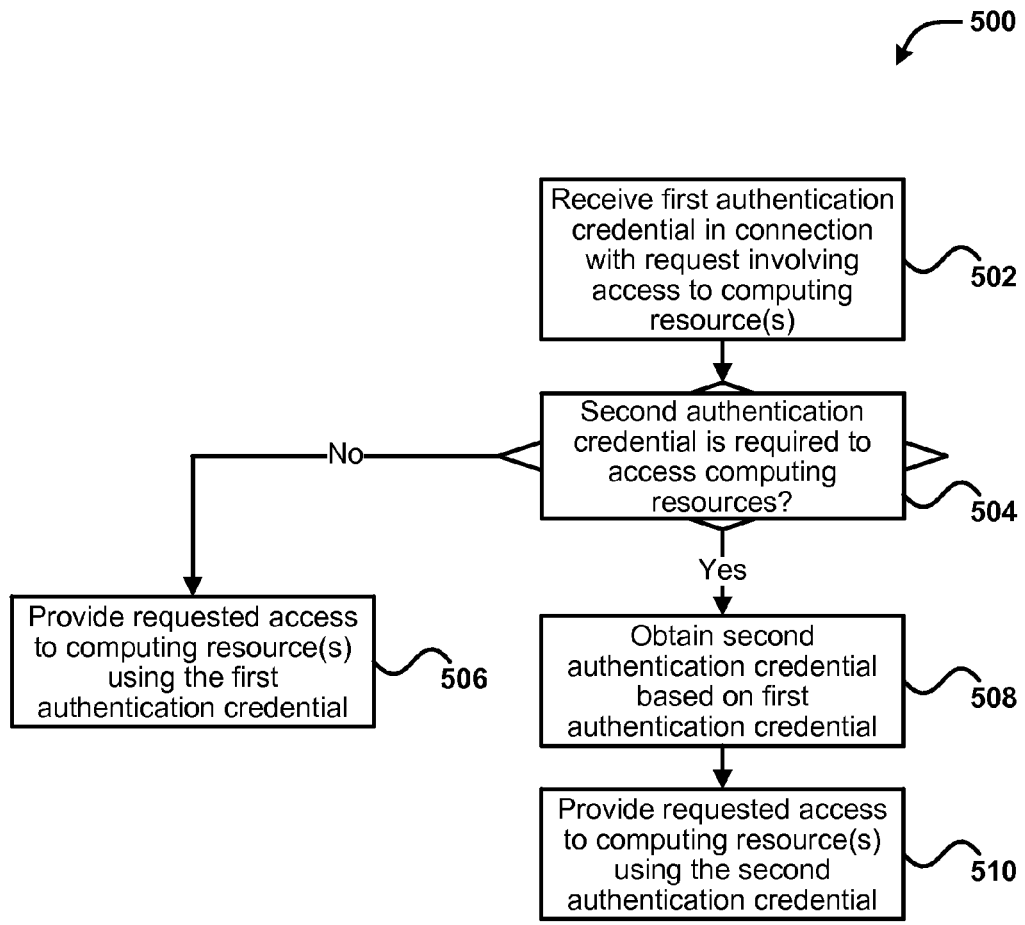
FIG. 5 illustrates an example process for providing access to computing resources, in accordance with one embodiment.

FIG. 5 illustrates an example process 500 for providing access to computing resources, in accordance with one embodiment. In some embodiments, a frontend service as discussed in connection with FIGS. 1, 2 and 3 performs process 500. Process 500 is similar to process 400 illustrated by FIG. 4, except that in some embodiments, process 500 may be performed to process client requests after the client is authenticated (e.g., after a session has been established) and process 400 may be performed to process unauthenticated client requests.

In block 502, the system performing process 500 receives a first authentication credential in connection with a request involving access to one or more computing resources. The request may include information such as described in connection with block 402 of FIG. 4. In an example embodiment, the request is sent along with an authentication credential. Such authentication credential is typically issued after the client has been authenticated, for example, as described in connection with block 408 of FIG. 4. For example, the authentication credential may include a session credential as described above. In some other embodiments, the system performing 500 verifies the validity of the authentication credential to determine if the client needs to be re-authenticated. For example, the system may check an expiration timestamp of the authentication credential, client IP address and the like. If it is determined that the client need to be re-authenticated, the system may re-authenticate the client in a similar manner as described in connection with block 404 of FIG. 4. In various embodiments, blocks 504, 506, 508 and 610 may be performed in a similar manner as described in connection with blocks 410, 416, 412 and 414 of FIG. 4, respectively.

Figure 6:
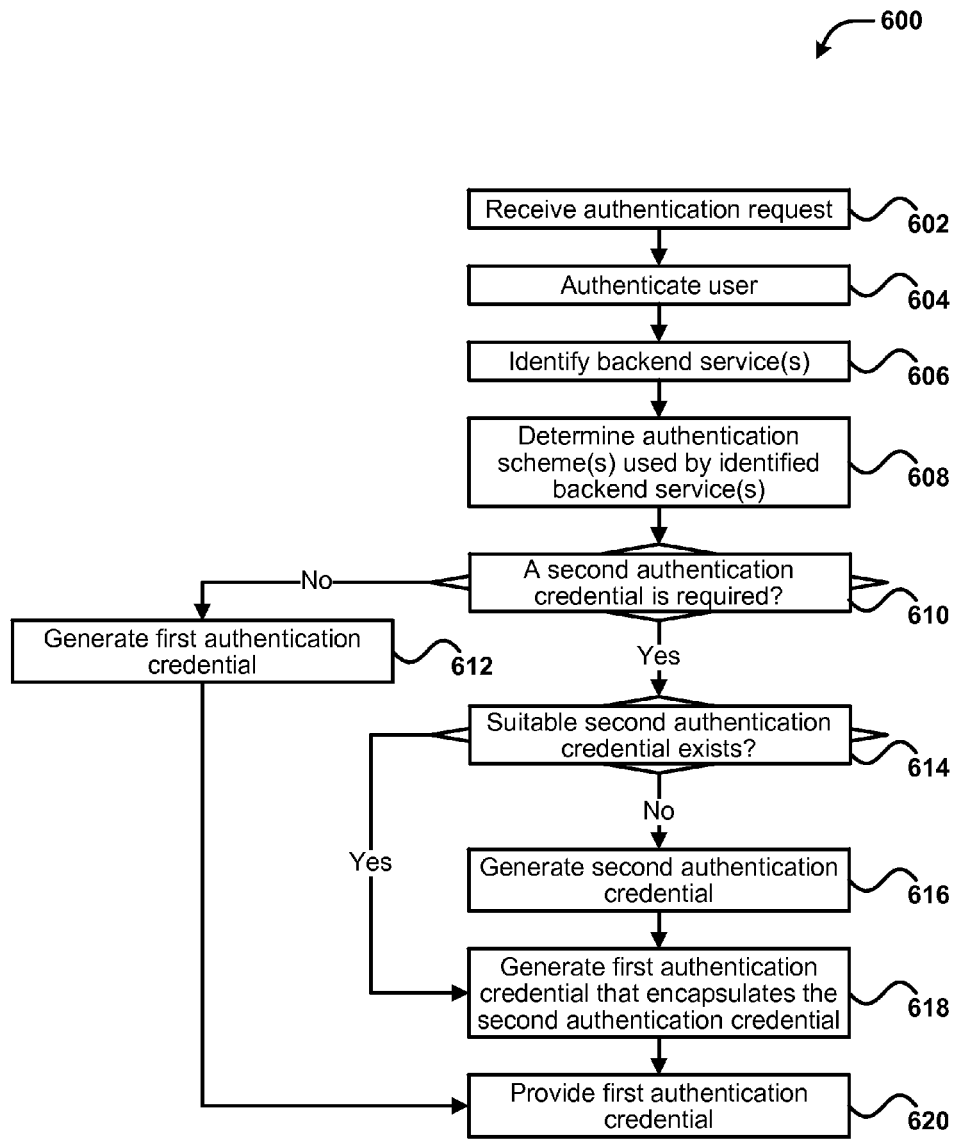
FIG. 6 illustrates an example process for providing authentication credentials, in accordance with one embodiment.

FIG. 6 illustrates an example process 600 for providing authentication credentials, in accordance with one embodiment. In some embodiments, an authentication credential provider as discussed in connection with FIGS. 1, 2 and 3 performs process 600. In some embodiments, a system performing process 600 may be used to authenticate a user and to obtain a first authentication credential according to a first authentication scheme as described in connection with blocks 404 and 408 of FIG. 4. In other embodiments, the system may be used to obtain a first authentication credential according to a first authentication scheme as described in connection with block 408 of FIG. 4.

In block 602, a system performing process 600 receives an authentication request. In various embodiments, such authentication request may include a client request to access one or more computing resources as described in connection with block 402 of FIG. 4. In block 604, the system authenticates the client in a similar manner as described in connection with block 404 of FIG. 4. In some embodiments, process 600 may be performed after a client has been successfully authenticated. In such cases, the system implementing process 600 may not authenticate the client (i.e., skipping block 604). In various embodiments, the system performing 600 has access to information relevant to generating a first authentication credential (e.g., a session credential) according to a first authentication scheme (e.g., a session-based authentication scheme). For example, the system may be configured to generate credentials for the first authentication scheme according to a predetermined format based on parameters in a configuration file, client identity information included in the client request, information obtained from an authentication process and the like.

In block 606, the system performing process 600 identifies one or more backend service(s) that are required to fulfill the client request to access one or more computing resources. In some embodiments, the system determines the backend service(s) based at least in part on information included in the client request such as a request address, path, or URI, client IP address, client identity information and the like. In other embodiments, the determination may also be based on configurable information, such as a configuration file.

In block 608, the system performing process 600 determines the authentication scheme(s) used by the backend service(s) identified in block 606. In some embodiments, the system may determine the authentication schemes corresponding to the identified backend services from a configuration file, a service provider, a system administrator or the like. In some other embodiments, the system may query the backend services regarding their authentication schemes, for example, as part of the system startup process or on a regular basis.

In decision block 610, the system performing process 600 determines whether a second authentication credential in accordance with a second authentication scheme is required. In some embodiments, the system compares the first authentication scheme with the authentication scheme(s) associated with the identified backend service(s). If any of the authentication scheme(s) associated with the identified backend services is different or otherwise incompatible with the first authentication scheme, then the system determines that authentication credential(s) corresponding to the different or otherwise incompatible authentication schemes are required. For example, if the first authentication scheme is session-based and a backend service required to fulfill the client request supports only an impersonation-based authentication scheme, then an impersonation credential is required to use the backend service. On the other hand, if the backend service supports session-based authentication scheme, then an impersonation credential is not required to use the backend service.

If a second authentication credential is determined not to be required, then in block 612, the system performing process 600 generates the first credential according to the first authentication scheme. For example, in one embodiment, the system generates a session credential that is a collection of information that may be used for gaining access to one or more computing resources. In various embodiments, a session credential may include information related to the user identity, a time stamp for the session credential, one or more policies limiting access in connection with the session credential, an expiration time after which the session credential is invalid, a starting time before which the session credential is invalid, credentials or a reference to credentials (such as a signing key) to be used to authenticate requests under the corresponding session, client IP address, multifactor authentication status and/or any other information that may be relevant in accordance with the various embodiments.

For example, in one embodiment, a session credential object may include at least the following attributes:

```
sessionCredential {
sessionId;
sessionToken;
signingKey;
expirationTS;
identity;
policies;
metadata;
. . .
}
```

In this example, the attribute sessionId may be an identifier used to identify a session established for a client. The attribute sessionToken may be used to encode the information included in the session credential. The attribute signingKey may encode a key used to sign a request. The attribute expirationTS may represent an expiration timestamp after which the session credential is invalid. The attribute identity may represent user identity information. The attribute policies may include zero or more policies restricting access in connection with the session credential. The attribute metadata may include information relevant to the authorization context of the session credential including, for example, client IP address, multifactor authentication status, issuance timestamp of the session credential and the like.

Still referring to FIG. 6, if a second authentication credential is determined to be required, then in decision block 614, the system performing process 600 determines whether a suitable second credential exists (e.g., in a cache). If so, the system simply retrieves the credential (e.g., from a cache) and wraps the first authentication credential around the retrieved second credential in block 618. Otherwise, the system generates at least part of a second credential from scratch in block 616. In one embodiment, the second credential is generated based at least in part on user identity information that may be derived from an authentication process. In another embodiment, the second credential is generated based at least in part on information included in the client request to access computing resources, such as client IP address. In another embodiment, the second credential is generated based at least in part on information obtained from other sources, such as a configuration file obtained from a service provider. For example, the system may construct an impersonation token that includes a user identifier, identifiers of groups that the user is a part of, identifier of a session, privileges associated with the user and the like.

In some embodiments, the second credential thus constructed is at least in part inoperable without additional information. For example, in some instances, a fully operable impersonation credential may require credential components derived using a backend server's system account power, which is lacking for the system performing process 600. In some embodiments, the system performing process 600 may encode instructions relevant to the construction of a fully operable credential in the partially constructed second credential, for example, as attributes of the second credential. For example, such instructions may specify which credential components to select, the manner with which the credential components should be combined and the like.

In block 618, the system performing process 600 generates the first authentication credential (e.g., session credential) by encapsulating the second credential (e.g., impersonation credential) created in block 616. In some embodiments, the second credential may be encoded by one or more attributes of the first credential. For example, a session credential object illustrated below may encapsulate an impersonation credential by setting the value of the sessionToken attribute to be an impersonation token which encodes an impersonation credential. A session credential may also encode instructions of how to generate a fully operable impersonation credential in existing attributes such as identity, policies, metadata and the like or additional attributes. For example, values in such attributes may be used to populate and/or look up or otherwise obtain values for attributes in an impersonation credential. Further, a session credential may set a sentinel value (such as a string "replace me") to one or more attributes such as sessionId or signingKey as an indication that a credential is encapsulated in the session credential. In various embodiments, the first authentication credential may encode any information in any suitable manner to facilitate the recognition and construction of the second authentication credential.

sessionCredential {
    sessionId; <-- set to a sentinel value
    sessionToken; <-- set to impersonation token
    signingKey;
    expirationTS;
    identity; <-- may be used to create impersonation credential
    policies; <-- may be used to create impersonation credential
    metadata; <-- may be used to create impersonation credential
    . . .
}

In block 620, the system performing process 600 provides the first authentication credential, for example, to a frontend service. As discussed above, the first authentication credential may be a regular authentication credential, such as generated in block 612, or a wrapper authentication credential such as generated in block 618.

In some embodiments, a system performing process 600 may be extended to provide authentication credentials for more than two authentication schemes. For example, in decision block 610, a system performing 600 may determine whether more than one additional authentication credentials corresponding to two or more authentication schemes need to be generated. Subsequently, the system may perform blocks 614-618 for each of the authentication schemes to generate and encapsulate the corresponding authentication credentials in the first authentication credential.

Figure 7:
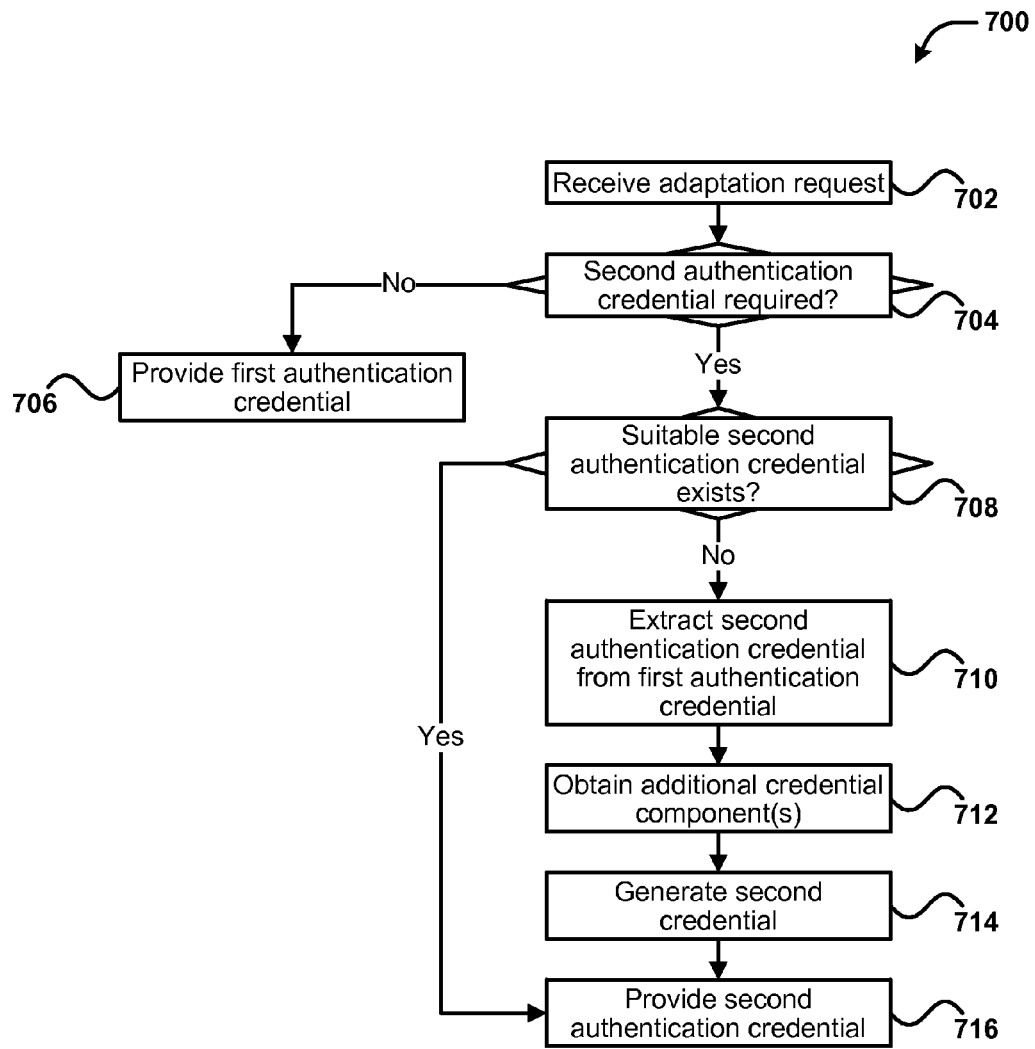
FIG. 7 illustrates an example process for adapting authentication credentials, in accordance with one embodiment.

FIG. 7 illustrates an example process 700 for adapting authentication credentials, in accordance with one embodiment. In some embodiments, an authentication credential adapter as discussed in connection with FIGS. 1, 2 and 3 performs process 700. In some embodiments, a system performing process 700 may be used to obtain an adapted authentication credential as described in connection with block 412 of FIG. 4.

In block 702, a system performing process 700 receives an adaptation request. In various embodiments, such authentication request may include a first authentication credential in accordance with a first authentication scheme. For example, the system may receive a session credential in accordance with a session-based authentication scheme. In some embodiments, the request also includes information derived from the original client request such as described in connection with block 402 of FIG. 4, or other information relevant to processing the adaptation request.

In decision block 704, the system performing process 700 determines whether a second authentication credential is required. In some embodiments, the system determines (e.g., based on a cache) whether a previous determination has been made with respect to similar adaptation requests. If so, the system may treat the current adaptation request in a similar fashion. Otherwise, in some embodiments, the system may identify one or more backend service(s) that are required to fulfill the client request to access one or more computing resources and determines whether the authentication scheme (s) used by backend service(s) are compatible with the first authentication scheme as described in connection with blocks 606-610 of FIG. 6. In some embodiments, the system may analyze the first authentication credential to detect whether adaptation of the first authentication credential is required. For example, the system may look for sentinel values or assertions included in the first authentication credential that may indicate the need for adaptation.

If it is determined that a second authentication credential is not required, then in block 706, the system performing process 700 provides the first authentication credential as is. In other embodiments, the system may provide an indication that the first authentication credential does not need adaptation, or other similar indications.

Otherwise, if it is determined that a second authentication credential is required, then in block 708, the system performing process 700 determines whether a suitable second authentication credential exists (e.g., in a cache). If so, in some embodiments, the system simply provides the second authentication credential in block 716. Otherwise, as shown below, the system adapts the first authentication credential to generate a second authentication credential based at least in part on the first authentication credential.

In block 710, the system performing process 700 extracts the encapsulated second credential from the first authentication credential. For example, the system may extract from the first authentication one or more attributes that encode the second authentication credential. In some embodiments, the system may determine that the first authentication credential encapsulates a second authentication credential by recognizing one or more sentinel values contained in the first authentication credential. In other embodiments, the system may make the determination by examining additional assertions in the first authentication credential, such as a credential origination assertion, that indicates that the first authentication credential encapsulates a second authentication credential.

In some embodiments, the extracted second credential is at least in part inoperable without additional information. For example, in some instances, the extracted second credential may require additional components derived from a server's system account power. Accordingly, in block 712, the system performing process 700 may optionally obtain additional credential components to construct a fully operable second credential. In various embodiments, such additional credential components may be obtained from various sources. For example, the system may select a set of credential components from a credential component database as described in connection with FIG. 1. Examples of credential components may include signing keys, cryptographic keys, policies, user authorization information and the like. The system may also obtain additional components from the first authentication credential, the client request, a configuration file, an API or service provided by the service provider, a user and the like. For example, the system may obtain a timestamp or a random number by calling an appropriate process or service.

In some embodiments, the system performing process 700 may use the same set of components to construct each credential. For example, the system may possess a system account power to construct impersonation credentials using a single set of credentials stored in an impersonation credential pool for all requests. In other embodiments the system may vary the components used to construct a credential based at least in part on the adaptation request. For example, the system may select credential components for system account power for different services depending on which service(s) are requested by the client. For another example, the system may select credential components based on sentinel values (e.g., "replaceme.service2") or additional assertions included in the first authentication credential.

In block 714, the system performing process 700 combines the additional credential components obtained in block 712, discussed above, with the extracted second credential to form a fully operable authentication credential (e.g., an impersonation credential). In various embodiments, the system may obtain instructions on how to construct the second authentication credential from various sources. In some embodiments, the first authentication credential may encode instructions on how to construct the second authentication credential. For example, the first authentication credential may include user identity information, authorization context metadata and other information that may be used to construct the second authorization credential. In other embodiments, the system may obtain instructions from a configuration file, an API or service provided by the service provider, a user, or other sources.

In block 716, the system provides the second authentication credential. In various embodiments, the system may provide the second authentication credential to one or more frontend services, backend services or the like, to enable the requested access to one or more computing resources.

In various embodiments, process 700 may be performed in sequence or in parallel to process and adapt, if necessary, more than one authentication credentials. In some embodiments, the system performing process 700 may be extended to provide adapted authentication credentials for more than one authentication schemes. For example, in decision block 704, a system performing 700 may determine whether more than one additional authentication credentials corresponding to two or more authentication schemes need to be generated. Subsequently, the system may perform blocks 708-714 for each authentication schemes to obtain corresponding authentication credentials, some of which may be adapted based at least in part on the first authentication credential.

Figure 8:
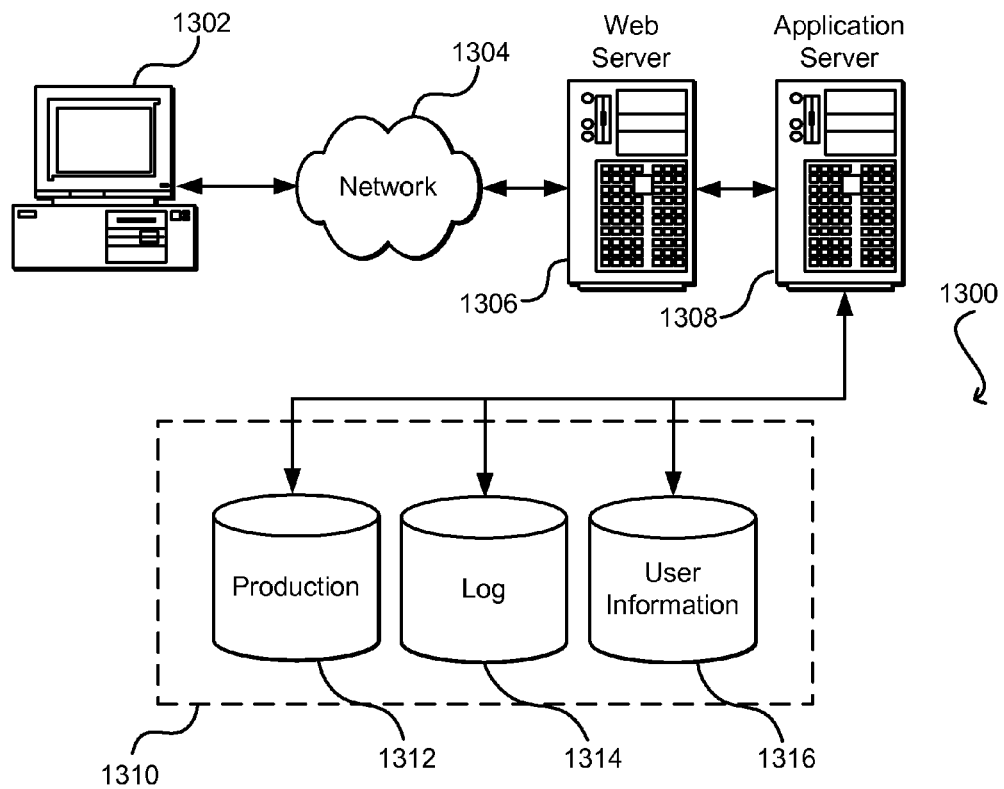
FIG. 8 illustrates aspects of an example environment for implementing aspects in accordance with various embodiments.

FIG. 8 illustrates aspects of an example environment 800 for implementing aspects in accordance with various embodiments. As will be appreciated, although a Web-based environment is used for purposes of explanation, different environments may be used, as appropriate, to implement various embodiments. The environment includes an electronic client device 802, which can include any appropriate device operable to send and receive requests, messages, or information over an appropriate network 804 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 806 for receiving requests and serving content in response thereto, although for other networks an alternative device serving a similar purpose could be used as would be apparent to one of ordinary skill in the art.

The illustrative environment includes at least one application server 808 and a data store 810. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing and retrieving data, which may include any combination and number of data servers, databases, data storage devices and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio and/or video to be transferred to the user, which may be served to the user by the Web server in the form of HTML, XML, or another appropriate structured language in this example. The handling of all requests and responses, as well as the delivery of content between the client device 802 and the application server 808, can be handled by the Web server. It should be understood that the Web and application servers are not required and are merely example components, as structured code discussed herein can be executed on any appropriate device or host machine as discussed elsewhere herein.

The data store 810 can include several separate data tables, databases, or other data storage mechanisms and media for storing data relating to a particular aspect. For example, the data store illustrated includes mechanisms for storing production data 812 and user information 816, which can be used to serve content for the production side. The data store also is shown to include a mechanism for storing log data 814, which can be used for reporting, analysis, or other such purposes. It should be understood that there can be many other aspects that may need to be stored in the data store, such as for page image information and to access right information, which can be stored in any of the above listed mechanisms as appropriate or in additional mechanisms in the data store 810. The data store 810 is operable, through logic associated therewith, to receive instructions from the application server 808 and obtain, update, or otherwise process data in response thereto. In one example, a user might submit a search request for a certain type of item. In this case, the data store might access the user information to verify the identity of the user and can access the catalog detail information to obtain information about items of that type. The information then can be returned to the user, such as in a results listing on a Web page that the user is able to view via a browser on the user device 802. Information for a particular item of interest can be viewed in a dedicated page or window of the browser.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 8. Thus, the depiction of the system 800 in FIG. 8 should be taken as being illustrative in nature and not limiting to the scope of the disclosure.

The various embodiments further can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS and AppleTalk. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad) and at least one output device (e.g., a display device, printer, or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed and/or removable storage devices as well as storage media for temporarily and/or more permanently containing, storing, transmitting and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Preferred embodiments of this disclosure are described herein, including the best mode known to the inventors for carrying out the invention. Variations of those preferred embodiments may become apparent to those of ordinary skill in the art upon reading the foregoing description. The inventors expect skilled artisans to employ such variations as appropriate and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. A system for providing access to computing resources, comprising:
   one or more processors; and
   memory, including instructions executable by the one or more processors to cause the system to at least:
   receive a request involving access to one or more computing resources;
   in response to the request, obtain, subsequent to successfully authenticating a user, a first credential in accordance with a first authentication scheme, the first credential encapsulating at least part of a second credential in accordance with a second authentication scheme and information usable for generating the second credential;
   identify one or more backend services to be used to fulfill the request;
   determine, based at least in part on the identified one or more backend services, that the second credential in accordance with the second authentication scheme is needed to use the identified one or more backend services to fulfill the request;
   subsequent to determining that the second credential is needed, generating the second credential by at least extracting the encapsulated part of the second credential from the first credential; and
   provide the requested access to the one or more computing resources using at least the second credential.

2. The system of claim 1, wherein generating the second credential includes populating one or more attributes of the second credential based at least in part on encapsulated part of the second credential and the information usable for generating the second credential.

3. The system of claim 1, wherein the information usable for generating the second credential is based at least in part on the request involving access to the one or more computing resources.

4. The system of claim 1, wherein at least some of the information usable for generating the second credential is encoded by one or more attributes of the first credential.

5. The system of claim 1 wherein generating the second credential includes:
   selecting one or more credential components from a plurality of credential components based at least in part on the request; and
   combining the part of the second credential that is extracted from the first credential with the selected one or more credential components.

6. The system of claim 5, wherein selecting the one or more credential components is further based at least in part on the information usable for generating the second credential.

7. A computer-implemented method for providing adaptation between authentication schemes, comprising:
   under the control of one or more computer systems configured with executable instructions,
   receiving an adaptation request, the adaptation request based at least in part on a first credential in accordance with a first authentication scheme, the first credential being generated in response to a request involving access to one or more computing resources and the first credential encoding information usable for generating a second credential in accordance with a second authentication scheme;
   determining, based at least in part on the first credential, a need to provide the second credential; and
   generating the second credential based at least in part on the information usable for generating the second credential.

8. The computer-implemented method of claim 7, wherein determining the need to provide the second credential comprises:
   identifying one or more backend services to be used to fulfill the request; and
   determining, based at least in part on the identified one or more backend services, that the second credential in accordance with the second authentication scheme is needed to use the identified one or more backend services to fulfill the request.

9. The computer-implemented method of claim 7, wherein determining whether to provide the second credential comprises at least identifying an indication of whether to generate the second credential that is included in the first credential.

10. The computer-implemented method of claim 7, wherein generating the second credential includes extracting at least a portion of the second credential, the extracted at least portion of the second credential being encoded in the first credential.

11. The computer-implemented method of claim 10, wherein generating the second credential further comprises:
   selecting one or more credential components from a plurality of credential components based at least in part on the information usable for generating the second credential; and populating one or more attributes of the second credential based at least in part on the extracted portion of the second credential and the selected one or more credential components.

12. The computer-implemented method of claim 7, wherein the information usable for generating the second credential is encoded by one or more attributes of the first credential.

13. A computer system for providing access to computing resources, comprising:
one or more processors; and
memory, including executable instructions that, when executed by the one or more processors, cause the one or more processors to collectively at least:
receive a first credential in connection with a request involving access to one or more computing resources, the first credential in accordance with a first authentication scheme and the first credential including information usable for generating a second credential in accordance with a second authentication scheme;
determine, based at least in part on the first credential, a need to adapt the first credential to the second credential to fulfill the request involving access to the one or more computing resources;
generate, based at least in part on the first credential, the second credential; and
provide the requested access to the one or more computing resources using at least the second credential.

14. The computer system of claim 13, wherein the first credential is generated in response to the request involving access to one or more computing resources subsequent to a successful authentication process by a user.

15. The computer system of claim 13, wherein determining the need to adapt the first credential comprises:
identify one or more backend services to be used to fulfill the request; and
determine, based at least in part on the identified one or more backend services, that the second credential in accordance with the second authentication scheme is needed to use the identified one or more backend services to fulfill the request.

16. The computer system of claim 13, wherein generating the second credential comprises:
extracting a part of the second credential that is included the first credential;
obtaining additional information necessary to generate the second credential based at least in part on the information usable for generating the second credential; and
combining the extracted part of the second credential with the additional information.

17. The computer system of claim 16, wherein obtaining additional information includes obtaining one or more credential components based at least in part on one or more attributes of the first credential.

18. The computer system of claim 13, wherein providing the requested access includes obtaining, based at least in part on the first credential, a plurality of credentials in accordance with a plurality of authentication schemes, the plurality of credentials being required to access the one or more computing resources.

19. One or more non-transitory computer-readable storage media having collectively stored thereon instructions executable by one or more processors of a computer system that, when executed by the one or more processors, cause the computer system to at least:
receive a first credential generated in accordance with a first authentication scheme, the first credential being associated with a request involving access to one or more computing resources and encapsulating information usable for generating a second credential in accordance with a second authentication scheme; and
determine, based at least in part on the first credential, a need to provide the second credential; and
generate the second credential based at least in part on the information usable for generating the second credential.

20. The one or more non-transitory computer-readable storage media of claim 19, wherein determining the need to provide the second credential comprises:
identifying one or more backend services to be used to fulfill the request involving access to the one or more computing resources; and
determining, based at least in part on the identified one or more backend services, that the second credential in accordance with the second authentication scheme is needed to use the identified one or more backend services to fulfill the request.

21. The one or more non-transitory computer-readable storage media of claim 19, wherein the first credential encapsulates at least in part the second credential and wherein generating the second credential includes extracting the encapsulated second credential.

22. The one or more non-transitory computer-readable storage media of claim 21, wherein generating the second credential comprises:
selecting one or more credential components from a plurality of credential components based at least in part on the information encapsulated in the first credential; and
combining the extracted second credential with the selected one or more credential components.

23. The one or more non-transitory computer-readable storage media of claim 22, wherein combining the extracted second credential with the selected one or more credential components includes populating one or more attributes of the extracted second credential with values derived at least in part from the selected one or more credential components.

24. The one or more non-transitory computer-readable storage media of claim 19, wherein the instructions further cause the computer system to provide the requested access to the one or more computing resources using at least the second credential.

\* \* \* \* \*